United States Patent
Ginn

(10) Patent No.: US 6,205,953 B1
(45) Date of Patent: Mar. 27, 2001

(54) CAT LITTER CONTAINER

(75) Inventor: Sharron A. Ginn, 412 Emory Phillips Rd., Sharpsburg, GA (US) 30277

(73) Assignee: Sharron A. Ginn, Sharpsburg, GA (US)

(*) Notice: Subject to any disclaimer, the term of this patent is extended or adjusted under 35 U.S.C. 154(b) by 0 days.

(21) Appl. No.: 09/259,953

(22) Filed: Feb. 26, 1999

(51) Int. Cl.$^7$ .................................................. A01K 29/00
(52) U.S. Cl. ........................................................... 119/165
(58) Field of Search .................................. 119/165, 161, 119/166, 458, 479; D30/161

(56) References Cited

U.S. PATENT DOCUMENTS

| | | | |
|---|---|---|---|
| 4,615,300 | 10/1986 | McDonough | 119/1 |
| 4,723,510 | 2/1988 | Skillestad | 119/1 |
| 5,121,712 | 6/1992 | Alfa-Pet, Inc. | 119/167 |
| 5,158,042 | 10/1992 | Hammerslag | 119/167 |
| 5,195,464 | 3/1993 | Mutter | 119/165 |
| 5,218,930 | 6/1993 | Casmira | 119/165 |
| 5,220,886 * | 6/1993 | Hyde | 119/165 |
| 5,329,878 | 7/1994 | McCauley | 119/165 |
| 5,329,879 | 7/1994 | Walton | 119/166 |
| 5,517,947 | 5/1996 | Christmas | 119/167 |
| 5,676,090 * | 10/1997 | Cannady, Jr. | 119/165 |
| 5,713,302 * | 2/1998 | Walter | 119/165 |
| 5,791,289 | 8/1998 | Savicki | 119/165 |

\* cited by examiner

*Primary Examiner*—Peter M. Poon
*Assistant Examiner*—Yvonne R. Abbott

(57) ABSTRACT

A cat litter container includes a base and a retaining side wall extending from the base in a manner to form a partial enclosure and having an access surface provided. The access surface includes a ramp interconnecting the retaining side wall and base which together with the base and retaining wall serve as a primary container for cat litter. A cavity is formed between the ramp, base and retaining side wall. The ramp further includes a plurality of opening surfaces to permit cat litter pass therethrough. A removable tray is disposed in the cavity beneath the ramp to catch cat litter as it passes through the open surfaces of the ramp. A tread surface is also formed on the ramp.

5 Claims, 2 Drawing Sheets

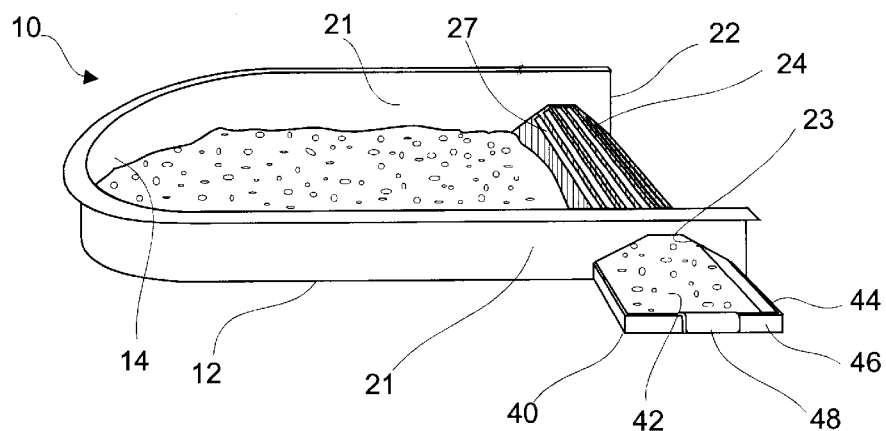
Fig. 1
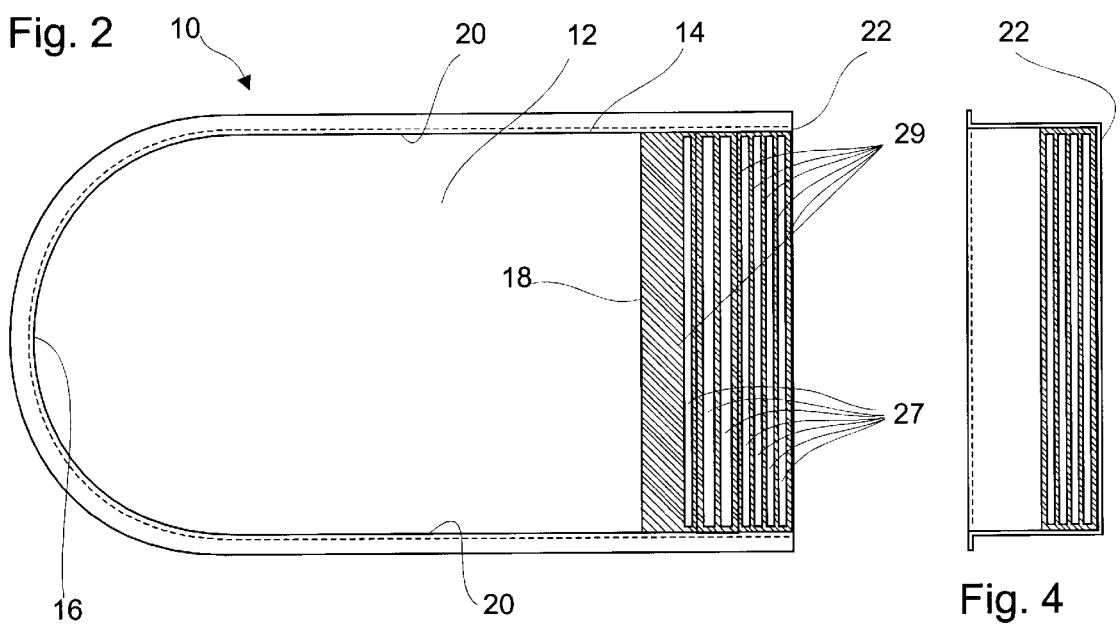
Fig. 2
Fig. 4
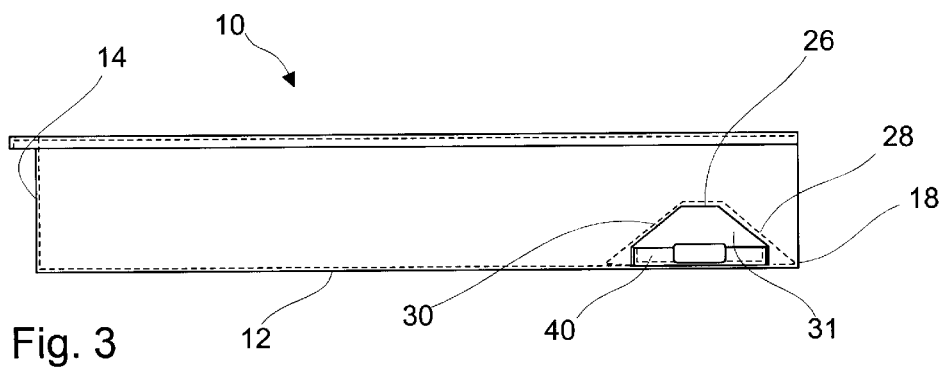
Fig. 3

CAT LITTER CONTAINER

BACKGROUND OF THE INVENTION

1. Field of the Invention

The present invention relates to pet litter containers. More particularly, the invention relates to a cat litter container with improved features for ingress and egress.

2. Related Art

There exist a number of litter boxes in the art. Litter boxes are commonly used indoors to retain cat waste. A waste and order absorbing material are commonly employed into the litter box. The litter box usually includes a base and side walls, wherein the side walls are sufficiently high enough to prevent the waste and absorbing material from being easily kicked out of the litter box by the pet, such as a cat.

The wall height presents problems for young, aging and ill cats which cannot climb over the side walls. Accordingly, there is a need to accommodate cats suffering from these characteristics. One way to solve the problem has been to lower the height or remove part of the wall. This defeats the retaining purpose of the wall and is not desirable. Also, providing a mere ramp for ingress and egress into the litter box still suffers from the problem of permitting litter and absorbing material to be displaced by the pet from the box upon entry and exit.

There remains a need for an improved cat litter container which accommodates these types of pets. The present invention solves these problems.

BRIEF SUMMARY OF THE INVENTION

It is an object to improve litter containers.

It is another object to ease ingress and egress of cat litter containers while maintaining cleanliness about the same.

It is another object to provide a container which can also serve as a bed.

Accordingly, the present invention is directed to a cat litter container having an improved ingress and egress. The cat litter container includes a base and a retaining side wall extending from the base in a manner to form a partial enclosure and having an access surface is provided.

The access surface includes a ramp interconnecting the retaining wall and base and has a raised portion which together with the base and retaining wall serve as a primary container for cat litter. The ramp further includes a plurality of opening surfaces to permit cat litter pass therethrough. A cavity is formed beneath the ramp. A removable tray is disposed in the cavity beneath the ramp to catch cat litter as it passes through the open surfaces of the ramp, thus serving as a secondary container. A tread is also formed on the ramp.

Other objects and advantages will be readily apparent to those skilled in the art upon viewing the drawings and reading the detailed description hereafter.

BRIEF DESCRIPTION OF THE DRAWINGS

FIG. 1 is a perspective view of the present invention.

FIG. 2 is a top view of the present invention.

FIG. 3 is a cross-sectional view of the present invention.

FIG. 4 is an end view of the present invention.

DETAILED DESCRIPTION OF THE INVENTION

Figure 5:
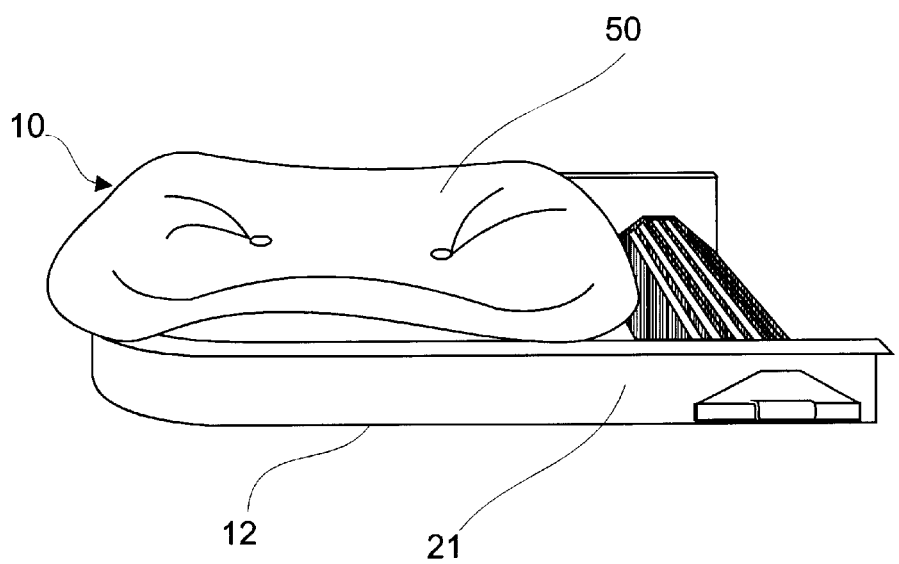
FIG. 5 is another perspective view of another use of the present invention.

Referring now to the drawings, the present invention is generally represented by the numeral 10. The cat litter container 10 can be made of plastic or metal, for example, and is preferably molded in two parts as will be apparent hereinafter. The invention refers to cats herein, but has application to other pets as well.

The cat litter container 10 includes a base 12 which is generally planar and having an arcuate end 16 and a straight end 18. The shape of the base 10 is set forth by example and it is understood that other configurations lend themselves to application in the present invention.

A retaining side wall 14 extends upwardly from the base 12 and is continuously connected to the end 16 and edges 20 of the base 12. Together, the retaining side wall 14 and base 12 form a partial enclosure having an access surface 22 provided.

The access surface 22 includes a ramp 24 interconnecting the retaining side wall 14 and base 12. The ramp 24 includes a raised plateau portion 26 interconnecting side wall portions 21 of wall 14. The ramp 24 includes an inclined ingress portion 28 interconnecting with the raised plateau portion 26, base 12 and retaining side wall 14 and a declined egress portion 30 interconnecting with the raised plateau portion 26, base 12 and retaining side wall 14. Together, the base 16, the ramp 24 and the retaining side wall 14 serve as a primary container for cat litter and absorbing material 50.

The ramp 24 includes a plurality of longitudinally extending opening surfaces 27 to permit cat litter and absorbing material 50 to pass therethrough. The ramp 24 further includes a tread surface 29 adjacent the open surfaces 27 which provide the cat a gripping surface. The tread surface 29 is preferably formed of a material which provokes the cat to cause it to rub its paws upon crossing the ramp 24 thereby removing litter and absorbing material 50 from its feet. The tread surface 29 can be integrally formed or be a material, such as carpet or rope, with a self adhesive-back material. This type of tread surface 29 will provoke the cat to interact with the surface 29 using its paws and claws, which is particularly useful as an aid to divert the cat from clawing other furniture in the dwelling. Beneath the ramp 24 is a cavity 31 which is formed between the ramp 24 side wall portions 21 and base 12.

One of the side wall portions 21 includes an open surface 23 to receive a tray 40 therethrough. The open surface 23 defines an opening generally within the connections defined by the ramp 24, base 12 and the side wall portions 21.

The tray 40 is slidably disposed onto the base 12 and into the cavity 31 by passing the tray through the opening 23. The tray 40 includes a base 42, sides 44 and ends 46 which are integrally connected. One of the ends 46 is formed with a gripping tab 48 for aiding removal from the cavity 31. Once the tray 40 is disposed beneath the ramp 24, cat litter and absorbing material 50 which passes through the open surfaces 27 of the ramp 24 will be caught therein.

The invention may further serve as a bed as depicted in FIG. 5. In this situation, the treads 29 serve as a surface which the cat may use to claw. Additionally, the tray 40 may be used to house air fresheners and other pet hygiene products.

The above described embodiment is set forth by way of example and is not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A cat litter container for containing cat litter and absorbing material therein which includes:

a base;

a retaining side wall extending from the base in a manner to form a partial enclosure having an access surface;

a ramp interconnecting said retaining wall and said base which together with said base and said retaining wall serve as a primary container for cat litter and absorbing material, wherein said ramp includes an open surface to permit cat litter and absorbing material pass there through; and a tray removably disposed beneath the ramp to serve as a secondary container to catch cat litter and absorbing material as it passes through said open surfaces of said ramp, wherein said ramp includes an inclined ingress, inclined egress and a plateau interconnecting said ingress and egress, and which is further characterized to include a plurality of longitudinally extending open surfaces which permit cat litter and absorbing material to pass therethrough.

2. The cat litter container of claim 1, wherein said ramp further includes a tread surface disposed about said open surfaces.

3. The cat litter container of claim 2, wherein said tread provokes a cat to rub its paws thereacross as the cat passes over said ramp.

4. The cat litter container of claim 1, which further includes a wall open surface in a portion of said side retaining wall and which extends between a connection of said ramp, said base and said retaining side wall such that said tray is removably disposable onto said base and beneath said ramp through said wall open surface.

5. The cat litter container of claim 4, wherein said tray includes a gripping tab on an end of said tray to aid in disposal and removal thereof.

* * * * *